(No Model.) 5 Sheets—Sheet 4.
W. MALAM.
STEAM BOILER.

No. 309,069. Patented Dec. 9, 1884.

Witnesses
John E. Parker
Harry Smith

Inventor
William Malam
by his Attorneys
Howson & Sons (No Model.) 5 Sheets—Sheet 5.

W. MALAM.
STEAM BOILER.

No. 309,069. Patented Dec. 9, 1884.

Witnesses
John E. Parker
Harry Smith

Inventor
William Malam
by his Attorneys
Howson & Sons

UNITED STATES PATENT OFFICE.

WILLIAM MALAM, OF EDGEMOOR, DELAWARE.

STEAM-BOILER.

SPECIFICATION forming part of Letters Patent No. 309,069, dated December 9, 1884.

Application filed July 11, 1884. (No model.)

*To all whom it may concern:*

Be it known that I, WILLIAM MALAM, a subject of the Queen of Great Britain and Ireland, and residing at Edgemoor, Newcastle county, Delaware, United States of America, have invented certain Improvements in Steam-Boilers, of which the following is a specification.

The object of my invention is to construct a strong steam-boiler having extended heating-surface and free circulation of water, so as to provide for the rapid generation of steam, and this object I attain in the manner hereinafter set forth, reference being had to the accompanying drawings, in which—

Figure 1:
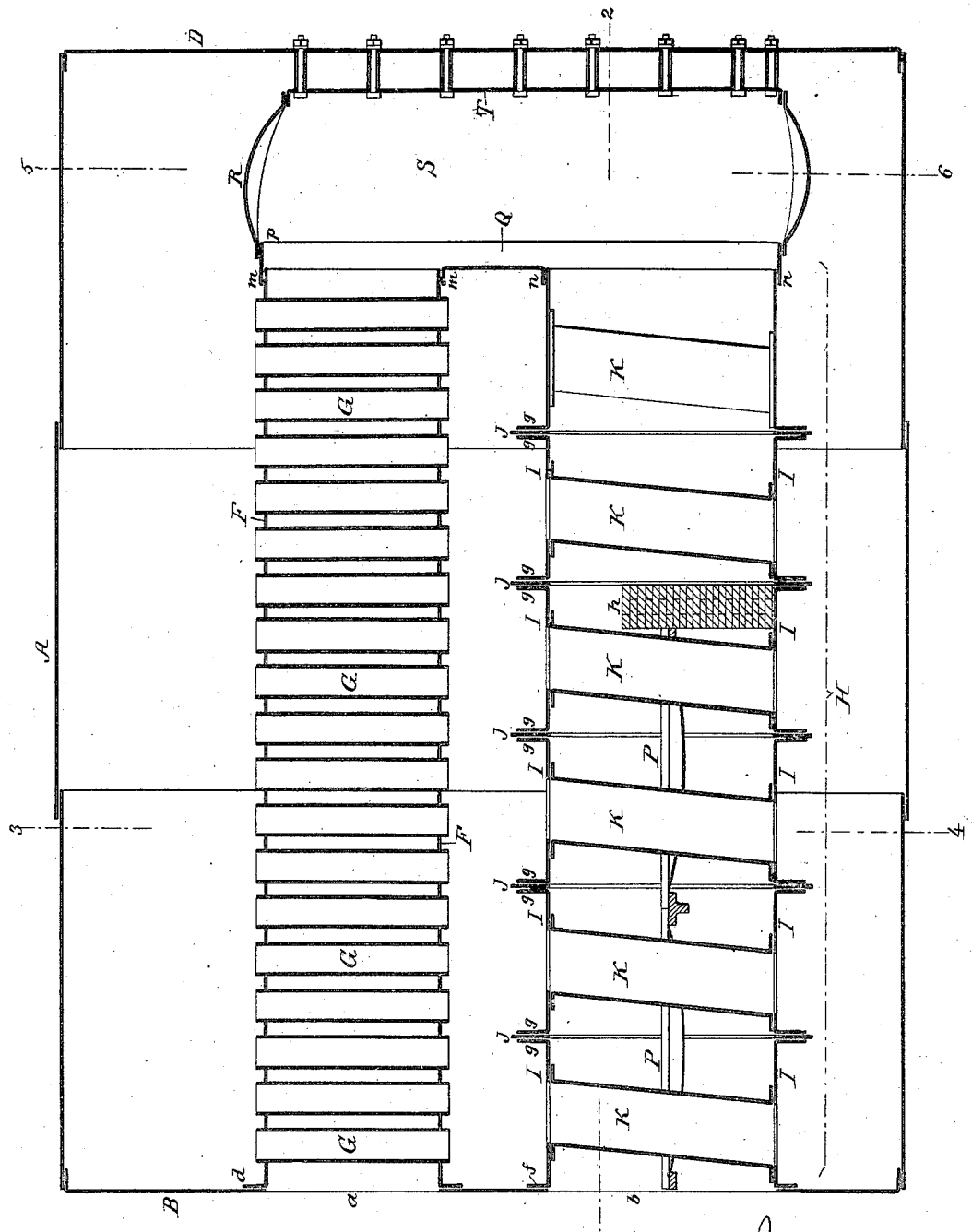
Figure 2:
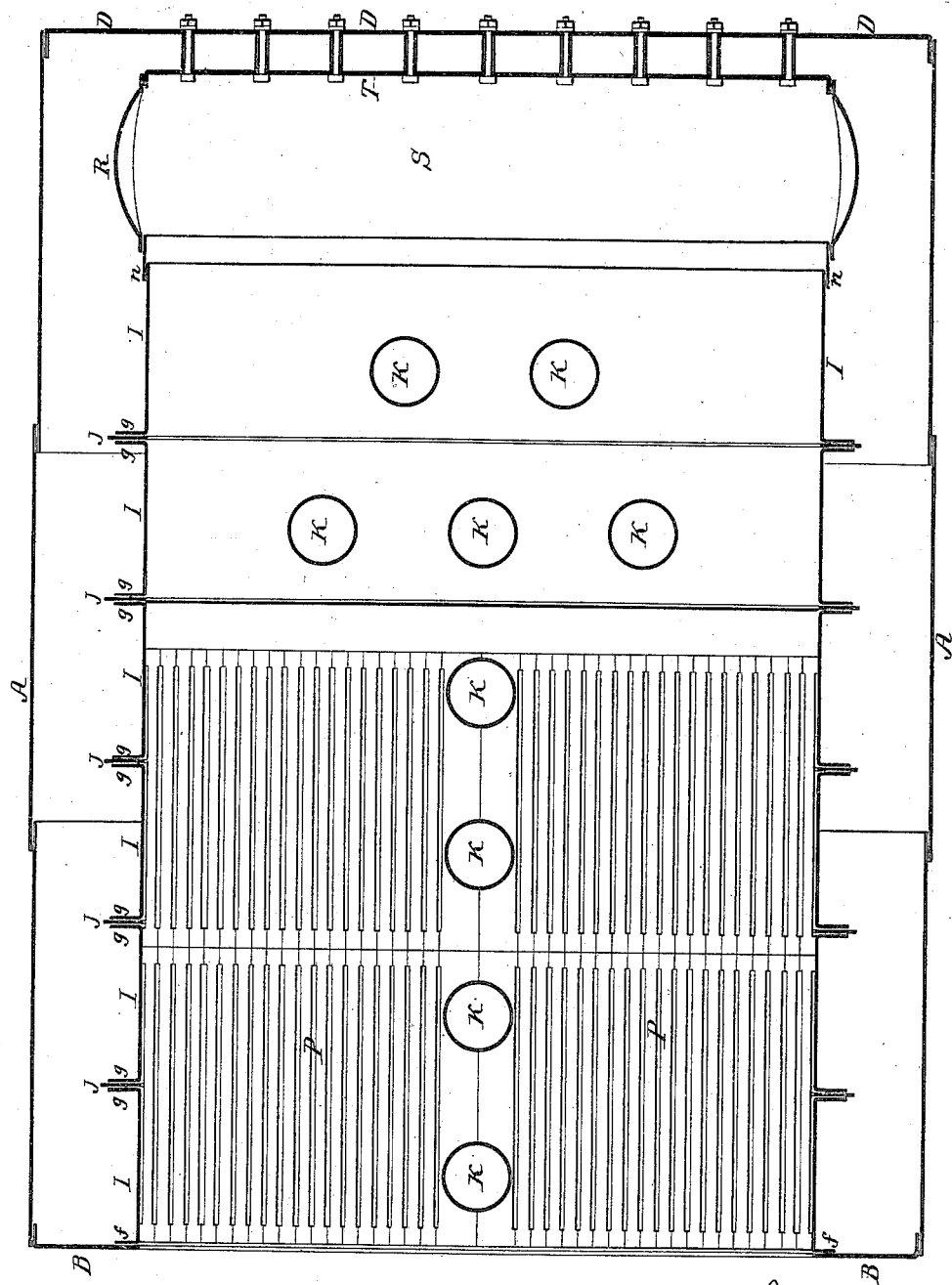
Figure 3:
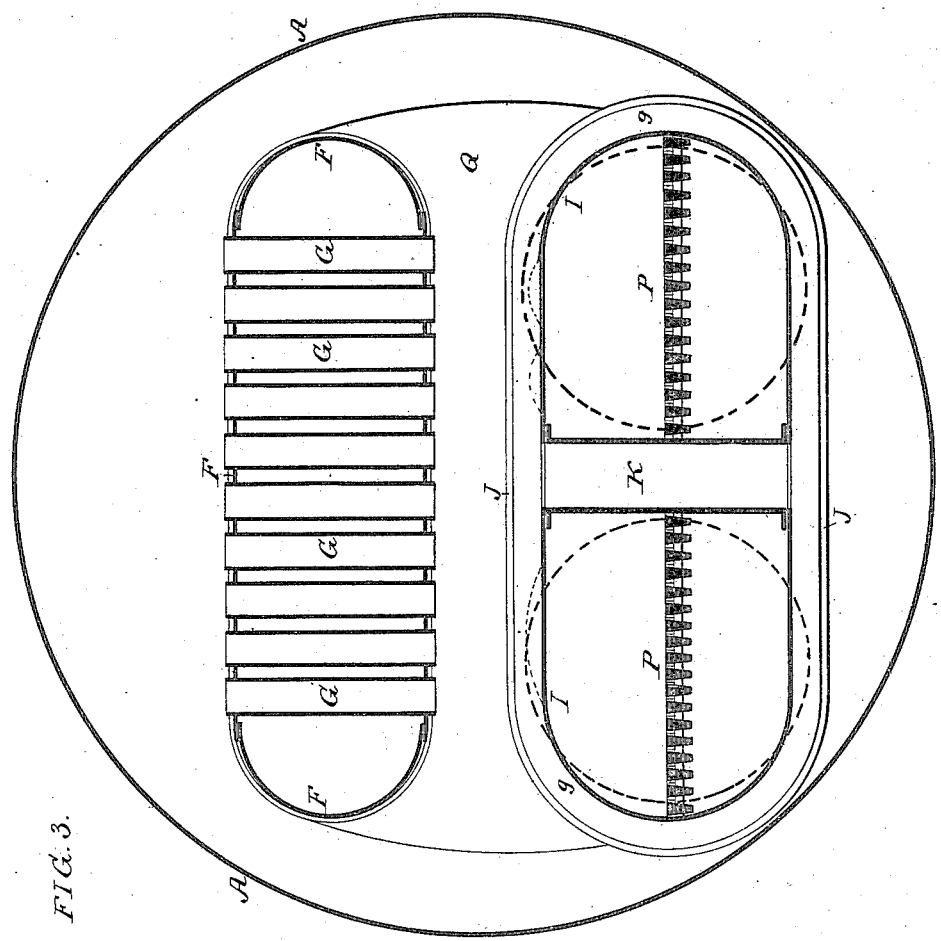
Figure 4:
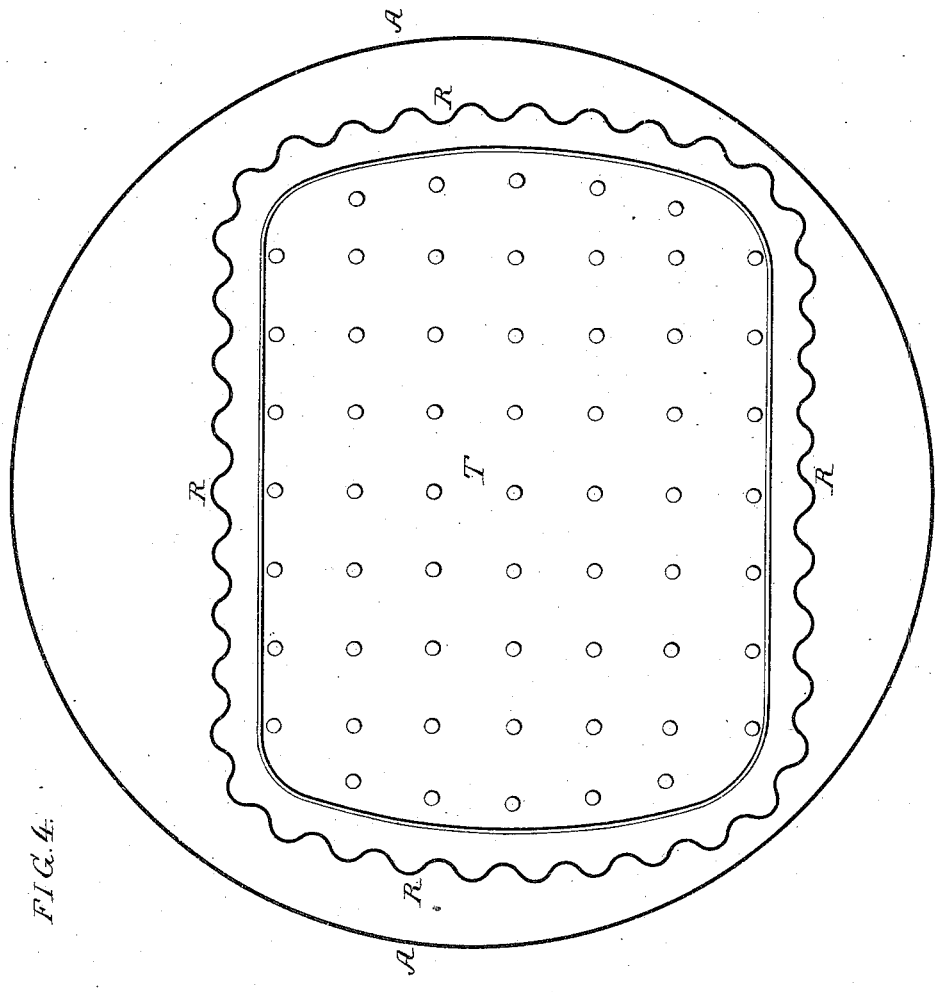
Figure 5:
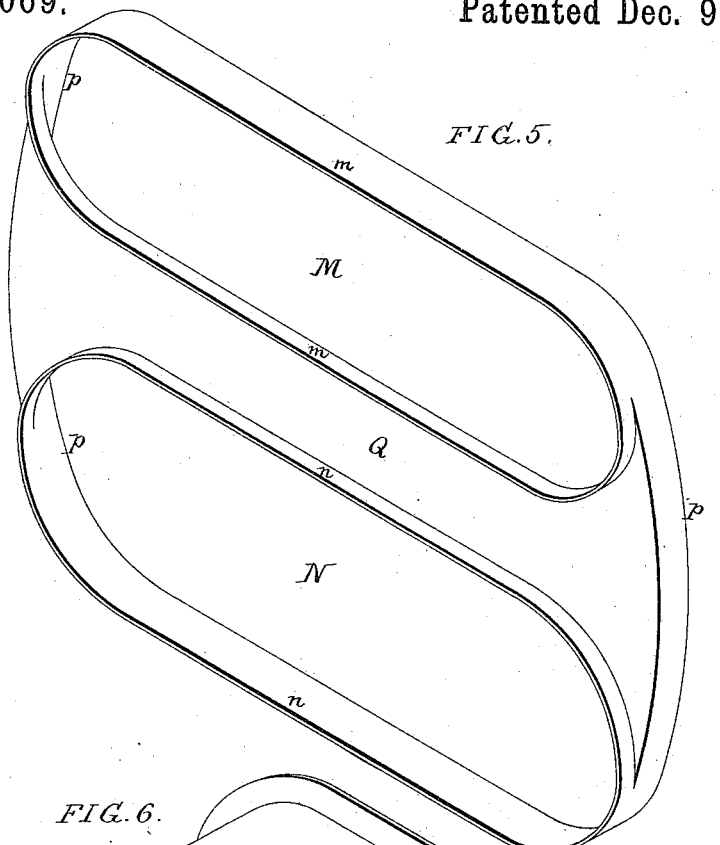
Figure 6:
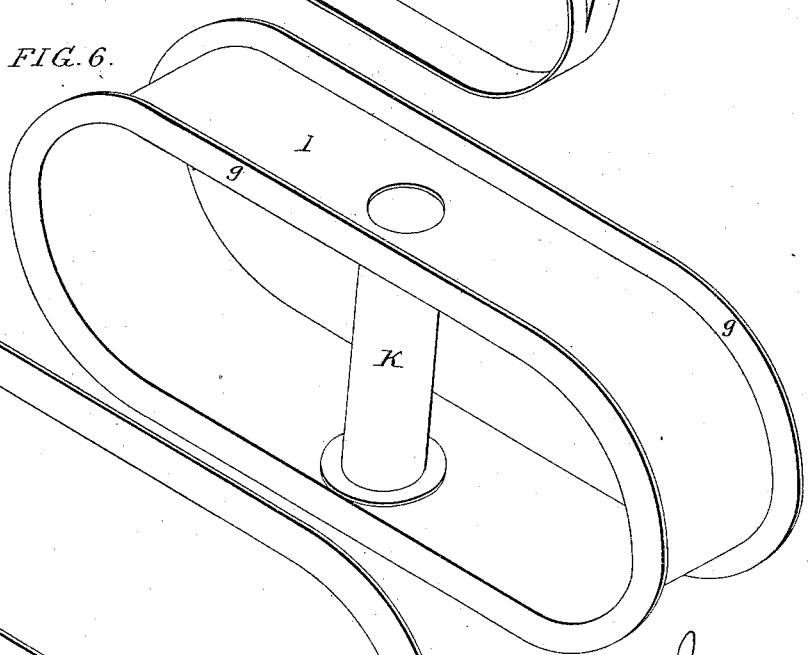
Figure 7:
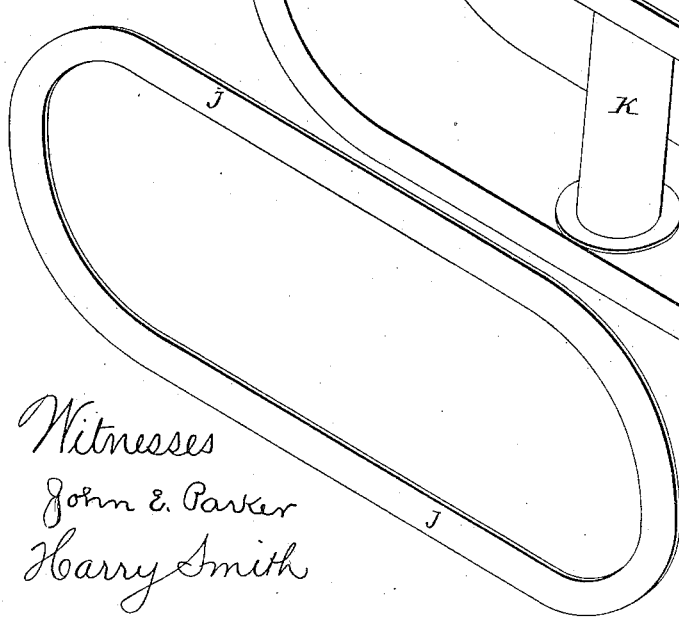

Figure 1, Sheet 1, is a longitudinal section of the boiler; Fig. 2, Sheet 2, a sectional plan on the line 1 2, Fig. 1; Fig. 3, Sheet 3, a transverse section on the line 3 4, Fig. 1; Fig. 4, Sheet 4, a transverse section on the line 5 6, Fig. 1; Fig. 5, Sheet 5, a perspective view of a plate for connecting the casings of the firebox flue and tube-flue of the boiler with the combustion-chamber casing; Fig. 6, a perspective view of one of the fire-box-flue sections, and Fig. 7 a perspective view of one of the bracing-rings of the fire-box flue.

A is the outer cylindrical shell of the boiler, and B and D the front and rear ends of the same, the front end having in it upper and lower elongated openings, *a* and *b*.

Around the edge of the upper opening, *a*, is riveted the flanged front end, *d*, of a flue-casing, F, across which extends a number of rows of vertical tubes, G, and around the edge of the lower opening, *b*, is riveted the flanged front end, *f*, of a fire-box-flue casing, H, which is composed of a number of flanged sections, I, and between the flanged heads *g* of these sections are interposed bracing-rings J, which serve to stiffen the flue-casing and prevent collapse of the same by pressure upon its flat surfaces. These surfaces may be corrugated, if desired, as shown by dotted lines in Fig. 3, in order to enable them to better resist the pressure to which they are subjected. The fire-box-flue casing is further braced by tubes K, slightly inclined rearward from bottom to top, the front of the flue having a single central row of tubes extending longitudinally between the fire-grates P, but the flue in the rear of the bridge-wall *h* having two transverse rows of tubes. These tubes, in addition to stiffening the flue-casing, serve to provide for the free circulation of the water and steam from the bottom to the center of the boiler, whence it passes through the tubes G to the top. The rear ends of the flue-casings F and H are fitted within and secured to the flanges *m* and *n*, surrounding elongated openings M and N in a plate, Q, the outer edge of which has a rearwardly-projecting flange, *p*, secured to the front end of the casing R of a combustion-chamber, S, the rear end of said casing being secured to a plate, T, connected by stay-bolts to the rear end, D, of the boiler-casing. The combustion-chamber casing R is corrugated, as shown in Fig. 4, so as to increase the heating-surface and permit ready expansion and contraction. As the entire surface of the casings of the fire-box flue, tube-flue, combustion-chamber, and both sets of tubes G and K is available as heating-surface, and a direct course is presented by said tubes G and K for the circulation of water, the rapid generation of steam is insured. The making of the fire-box-flue casing in sections facilitates the economical repair of said casing and provides for the convenient introduction of the bracing-rings J.

It should be understood that the boiler is to be furnished in front with the usual casing, inclosing a smoke-box communicating with the tube-flue and chimney; but as this forms no part of my invention it has not been illustrated in the drawings.

Instead of using an elongated fire-box flue with crossing tubes, as shown and described, I may in some boilers substitute therefor two or more circular fire-boxes, such as are now employed, and as shown by heavy dotted lines in Fig. 3; but the use of the flue with its tubes is preferred.

I claim as my invention—

The combination of the outer shell of the boiler, the lower flue having the fire-box, the upper flue having the crossing tubes, and the combustion-chamber connecting the two flues and having a corrugated casing, as set forth.

In testimony whereof I have signed my name to this specification in the presence of two subscribing witnesses.

WILLIAM MALAM.

Witnesses:
JOHN E. PARKER,
HARRY SMITH.